United States Patent
Dahan et al.

(10) Patent No.: US 12,457,181 B1
(45) Date of Patent: Oct. 28, 2025

(54) SYSTEM AND METHOD FOR SCHEDULING DISPLAY OF INCOMING MESSAGES

(71) Applicants: Meir Dahan, Tiberias (IL); Eliahu Antopolsky, Zichron Yaakov (IL)

(72) Inventors: Meir Dahan, Tiberias (IL); Eliahu Antopolsky, Zichron Yaakov (IL)

( * ) Notice: Subject to any disclaimer, the term of this patent is extended or adjusted under 35 U.S.C. 154(b) by 0 days.

(21) Appl. No.: 19/227,615

(22) Filed: Jun. 4, 2025

(51) Int. Cl.
  *H04L 51/00* (2022.01)
  *H04L 51/04* (2022.01)
  *H04L 51/226* (2022.01)
  *H04M 1/7243* (2021.01)
  *H04W 88/18* (2009.01)

(52) U.S. Cl.
  CPC .............. *H04L 51/00* (2013.01); *H04L 51/04* (2013.01); *H04L 51/226* (2022.05); *H04M 1/7243* (2021.01); *H04W 88/184* (2013.01)

(58) Field of Classification Search
  CPC ....... H04L 51/00; H04L 51/04; H04L 51/226; H04M 1/7243; H04W 88/184
  See application file for complete search history.

(56) References Cited

U.S. PATENT DOCUMENTS

| | | | | |
|---|---|---|---|---|
| 8,352,560 | B2* | 1/2013 | O'Sullivan | G06Q 10/107 709/206 |
| 2005/0249023 | A1* | 11/2005 | Bodlaender | H04M 3/53333 365/232 |
| 2009/0055500 | A1* | 2/2009 | Haynes | H04L 12/1827 709/207 |
| 2010/0332602 | A1* | 12/2010 | O'Sullivan | G06Q 10/107 709/206 |
| 2011/0312315 | A1* | 12/2011 | Garcia | H04W 4/16 455/422.1 |
| 2012/0083287 | A1* | 4/2012 | Casto | H04W 4/02 455/466 |
| 2020/0259776 | A1* | 8/2020 | Umapathy | H04L 51/226 |
| 2020/0259948 | A1* | 8/2020 | Keohane | H04M 1/72463 |

OTHER PUBLICATIONS

Author: Peter Akkies Title: How to Use Focus Modes on iPhone, iPad, and Mac (Tutorial) Date: Apr. 15, 2024 pp. 1-33 (Year: 2024).*

* cited by examiner

*Primary Examiner* — Irete F Ehichioya
*Assistant Examiner* — Phoebe X Pan

(57) ABSTRACT

A system and method for scheduling display of incoming messages that includes displaying a user interface to enable selection of contacts, specification of a scheduled time, and instruction to apply a non-displayed mod to messages from the selected contacts to the user until the scheduled time, receiving the user selection of the contacts and the scheduled time, receiving the incoming message, storing the message in the non-displayed mode and displaying the messages at the scheduled time.

2 Claims, 1 Drawing Sheet

SYSTEM AND METHOD FOR SCHEDULING DISPLAY OF INCOMING MESSAGES

FIELD OF THE INVENTION

The present invention relates generally to messaging applications and, more specifically, to a method and system for controlling the timing of the display of incoming messages on a user's mobile device and the activation of the notifications of the incoming messages.

Background Art

Messaging applications deliver messages in real time, notifying users immediately upon message receipt. While this approach enhances responsiveness, it may disrupt users during sensitive tasks or outside working hours. Current solutions such as "Do Not Disturb" or scheduled silencing modes prevent alerts but do not allow users to defer actual message display. There remains a need for method and system that allow users to selectively control when they see messages from particular contacts, without preventing senders from composing and sending the messages at any time.

SUMMARY OF THE INVENTION

The invention provides a method and a system for scheduled display of incoming messages in a messaging application, allowing a user to set a specific scheduled time at which incoming messages from all contacts and/or selected contacts will be displayed. The messages from the selected contacts are received and stored in a non-displayed mode until the scheduled time, after which they are rendered in the chat interface and notification may be issued.

The phrase "a non-displayed mode" as used in this disclosure and the claims refers to a state or mode in which a message sent to the user by a selected contact is stored-either on the messaging server, on a processor within the user's mobile device, or even on the sender's mobile device—but remains undisclosed to the user. Specifically, the message is not shown in the chat interface or elsewhere on the screen, such that it is entirely hidden and unknown to the user until the scheduled time set by the user. At that scheduled time, the message becomes visible within the relevant chat.

In some embodiments, the sender is notified that the recipient (the user) is in scheduled-display mode and is informed of the expected display time. Further embodiments allow the sender to override the schedule time by sending an override instruction with a scheduled earlier time, enabling an immediate or an early display of the message in exceptional cases in which the sender think that they are urgent.

DESCRIPTION OF THE DRAWINGS

The drawings are not intending to limits the scope of the invention and its application and they are intended only to illustrate implementation options of the invention.

THE INVENTION

Figure 1:
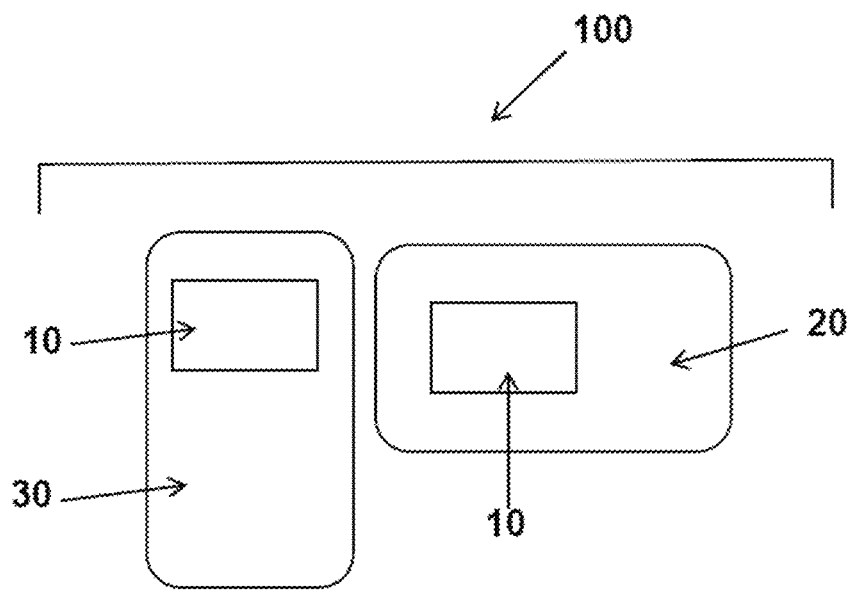
FIG. 1 is a schematic depiction of the system (100).

The invention is implemented in a messaging application executed by one or more processing devices (10), which may reside on a messaging server (20) or on a user's mobile device (30). The method may be executed, for example, by a processor of the server operated by the entity managing the messaging application and/or by a processor of the user's mobile device. The processor in the user's mobile device can be configured to receive incoming messages, store them in a non-displayed mode, (hidden), and subsequently display them on the screen (and possible activating a notification of incoming message)—only at a time specifically scheduled by the user.

A user interface (32) displayed on the screen (31) of the user's mobile device allows the user to select one or more contacts and to scheduled specific time for displaying messages from the selected contacts. The method and system of the present invention may enable the user to select all contacts and define a single scheduled display time for all incoming messages received prior to that scheduled time. Additionally, the method and system may allow the user to scheduled individual display times to each specific contact and to designate which contacts are subject to the delayed display of their messages. The user may have the option to choose one or more times for receiving the incoming messages each day.

Once configured, messages sent to the user by those selected contacts are received by the one or more processing devices and stored in a non-displayed mode. The user receives no visual or audible notification, and the messages are not shown in the chat interface (33) until the scheduled time is reached. These incoming messages may be stored for a while in the processor of the user's mobile device or on the processor on the messaging server.

At the scheduled time, the system (100) automatically displays the incoming message in the chat with the corresponding contact and may issue a standard notification.

In some embodiments, when the sender sends a message to a user in time of scheduled-display mode, a notice (42) is shown or displayed on the sender's mobile device (40) informing the sender that the message will be displayed and notified on the recipient's device at the scheduled time.

In further embodiments, the sender may send an override instruction (43) to override the schedule time. The override instruction may include a scheduled earlier time, which can be indicated via a time string (e.g., "4:15PM") or a keyword (e.g., "now"). Upon receipt of the override instruction, the processing devices are configured to display the stored message at the scheduled earlier time, even if it proceeds the scheduled display time specified by the user. The implementation of this function, can be done for example by sending a consequent text message with the time "4:15PM" or "now" for example, or, sent through a window in the chat dedicated for this function.

This invention enhances user control over message visibility without inhibiting communication and enables respectful and flexible interaction in both personal and professional settings. The purpose of the present invention is to allow the user to predefine a time for reading and responding to incoming messages, thereby reducing constant interruptions and supporting the user's mental well-being. By providing the sender with a notification indicating when their message will be displayed—and the ability to trigger earlier display in urgent situations—the system ensures that important communications are still addressed in a timely manner.

Examples: A user configures his messaging app to show messages only at 9:30AM and 5:30PM. Messages sent before 9:30AM are silently stored and displayed only at 9:30AM and messages sent between 09:30AM to 5:30PM are displayed at 5:30PM; A sender sees a notice that his message will be displayed only at that time and he may choose to override the delay by sending the override instruction that may include the word "now" resulting by immediate display, or, for example "3:00PM", resulting in earlier display that set by the user.

The term "messaging application" in this disclosure and the claims refers to instant messaging software applications, such as Messenger™, Snapchat™, WhatsApp™, Telegram™, iMessage™ and the like. The term "messages" in this disclosure and the claims refers to text messages, voice messages, video messages, and files, photos, stickers and emojis sent over messaging applications.

The term "mobile device" refers to any kind of smartphone, mobile device or a computer that is designed to have an internet connection and used to send and receive messages. The term "processing device" refers to a processor and/or a processing device on a server or on the mobile devices, or both.

Figure 2:
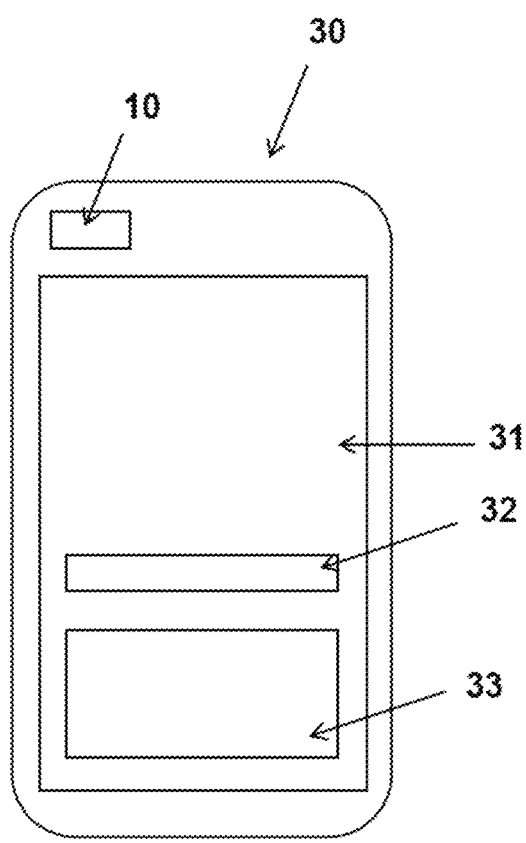
FIG. 2 is a schematic depiction of the user's mobile device (30).
Figure 3:
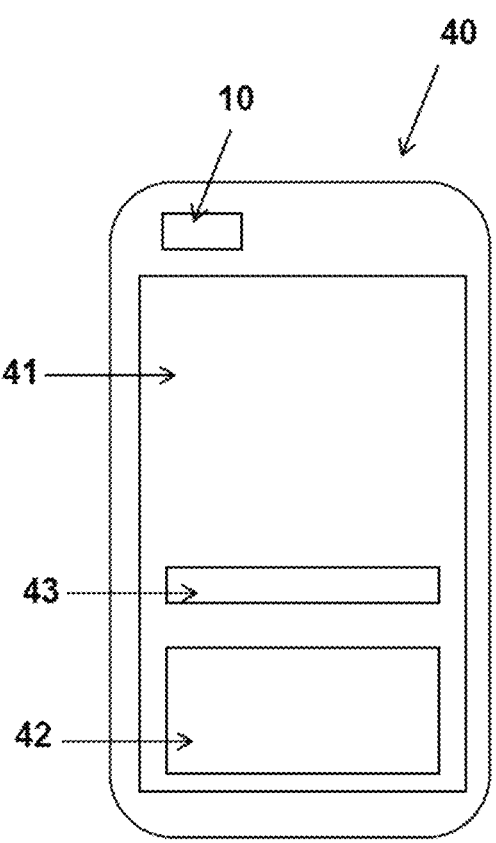
FIG. 3 is a schematic depiction of the sender's mobile device (40).

FIG. 1 schematically depicts the system (100) that includes the processing devices (10) on the user's mobile device and the messaging server, FIG. 2 depicts schematically the user's mobile device (30), and FIG. 3 depicts the sender's mobile device (40).

In summary, the present invention refers to the computer-implemented method for scheduling display of incoming messages in the messaging application executed by the one or more processing devices (10) operating on the messaging server (20) or the user's mobile device (30). The method includes the following means and steps:

Displaying on the screen (31) of the user's mobile device the user interface (32) that is configured to enable the user a selection of one or more contacts, specification of a scheduled time, and application of a non-displayed mode until the scheduled time.

Receiving via the user interface and by the one or more processing devices the followings: (a) a user selection of the contacts, (b) a user specification of the scheduled time, and (c) the user instruction to apply a non-displayed mode to incoming messages from the selected contacts until the scheduled time.

Receiving, by the processing devices, an incoming message intended for the user from the sender identified as one of the selected contacts. Storing the incoming message by the processing devices in the non-displayed mode until the scheduled time. And, displaying at the specified time the incoming message in the chat with the sender.

The method may further comprises the step of displaying, on a screen (41) of a mobile device (40) of the sender by a processing device (10) operating on the sender's mobile device (40), a notice (42) indicating that the message sent by the sender to the user will be displayed on the user's mobile device at the scheduled time. The notice may further indicates that the message is displayable on the user's mobile device earlier than the scheduled time upon sending an override instruction from the sender's mobile device, the override instruction including a defined scheduled earlier time.

The one or more processing devices are further configured to display that message on the user's mobile device at the scheduled earlier time. The processing devices are further configured to (i) recognize the override instruction and extract the scheduled earlier time; (ii) override the scheduled time with the scheduled earlier time; and (iii) display the message on the user's mobile device at the scheduled earlier time.

The present invention also refers to a computer system for scheduling the display of the incoming messages that comprises the one or more processing devices operating on the messaging server and/or the user's mobile device. The system is configured to: (a) display on the screen of the user's mobile device the user interface; (b) receive the user selection of the one or more contacts and the scheduled time; (c) receive the incoming message from the sender; (d) store the incoming message in the non-displayed mode until the scheduled time; and (e) display the message at the scheduled time. The system may further configured to display on the screen of the mobile device of the sender the notice indicating that the message will be displayed on the user's mobile device at the scheduled time.

The notice may further indicate that the message is displayable on the user's mobile device earlier than the scheduled time upon sending the override instruction from the sender. The override instruction includes a scheduled earlier time, and the processing devices are configured to: recognize the override instruction and extract the scheduled earlier time; override the scheduled time with the scheduled earlier time; and display the message on the user's mobile device at the scheduled earlier time.

What we claimed is:

1. A computer-implemented method for scheduling display of incoming messages in a messaging application executed by one or more processing devices operating on a messaging server or a user's mobile device, the method comprising:
    (a) displaying, on a screen of the user's mobile device, a user interface configured to enable selection of one or more contacts within the messaging application, specification of a scheduled time, and application of a non-displayed mode to incoming messages from the selected one or more contacts until the scheduled time;
    (b) receiving, by the one or more processing devices via the user interface, a user selection of one or more contacts, a specification of a scheduled time, and an instruction to apply a non-displayed mode to incoming messages from the selected one or more contacts until the scheduled time;
    (c) receiving, by the one or more processing devices, an incoming message over the messaging application intended for the user from a sender identified as one of the selected contacts;
    (d) storing, by the one or more processing devices, the incoming message in a non-displayed mode until the scheduled time;
    (e) displaying, at the scheduled time, the incoming message in a chat with the sender;
    (f) displaying, on a screen of a mobile device of the sender by a processing device operating on the sender's mobile device, a notice indicating that the message sent by the sender to the user is scheduled to be displayed on the user's mobile device at the scheduled time;
    wherein the notice further indicates that said message is displayable on the user's mobile device earlier than the scheduled time upon sending an override instruction by the sender,
    wherein the override instruction includes a scheduled earlier time and is identifiable by the one or more processing devices, and
    wherein the one or more processing devices are further configured to:
        (i) recognize the override instruction and extract the scheduled earlier time;

(ii) override the scheduled time with the scheduled earlier time; and
(iii) display the message on the user's mobile device at the scheduled earlier time.

2. A computer system for scheduling display of incoming messages in a messaging application, comprising:
one or more processors operating on a messaging server or a user's mobile device, wherein the system is configured to:
(a) display, on a screen of the user's mobile device, a user interface configured to enable selection of one or more contacts within the messaging application, specification of a scheduled time, and application of a non-displayed mode to incoming messages from the selected one or more contacts until the scheduled time;
(b) receive, via the user interface and by the one or more processors, a user selection of one or more contacts, a specification of a scheduled time, and an instruction to apply a non-displayed mode to incoming messages from the selected one or more contacts until the scheduled time;
(c) receive, by the one or more processors, an incoming message over the messaging application intended for the user from a sender identified as one of the selected contacts;
(d) store, by the one or more processors, the incoming message in a non-displayed mode until the scheduled time;
(e) display, at the scheduled time, the incoming message in a chat with the sender;
(f) display, on a screen of a mobile device of the sender by a processor operating on the sender's mobile device, a notice indicating that the message sent by the sender to the user is scheduled to be displayed on the user's mobile device at the scheduled time;
wherein the notice further indicates that said message is displayable on the user's mobile device earlier than the scheduled time upon sending an override instruction by the sender,
wherein the override instruction includes a scheduled earlier time and is identifiable by the one or more processors, and
wherein the one or more processors are further configured to:
(i) recognize the override instruction and extract the scheduled earlier time;
(ii) override the scheduled time with the scheduled earlier time; and
(iii) display the message on the user's mobile device at the scheduled earlier time.

* * * * *